(12) United States Patent
Shim et al.

(10) Patent No.: US 9,237,603 B2
(45) Date of Patent: Jan. 12, 2016

(54) APPARATUS AND METHOD FOR CHANGING OPERATION MODE OF DUAL MODE TERMINAL

(75) Inventors: Chung Seob Shim, Gyeonggi-do (KR); Byung Duck Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 2016 days.

(21) Appl. No.: 11/648,994

(22) Filed: Jan. 3, 2007

(65) Prior Publication Data

US 2007/0178935 A1 Aug. 2, 2007

(30) Foreign Application Priority Data

Jan. 13, 2006 (KR) .................. 10-2006-0004094

(51) Int. Cl.
*H04W 52/02* (2009.01)
*H04W 88/06* (2009.01)
*H04W 48/16* (2009.01)

(52) U.S. Cl.
CPC ............ *H04W 88/06* (2013.01); *H04W 52/028* (2013.01); *H04W 52/0235* (2013.01); *H04W 48/16* (2013.01); *Y02B 60/50* (2013.01)

(58) Field of Classification Search
CPC .................................................. H04W 52/028
USPC .............. 455/522.1, 432.1–433, 417, 456.5
See application file for complete search history.

(56) References Cited

U.S. PATENT DOCUMENTS

| 7,248,167 | B2 * | 7/2007 | Wassingbo ................ 340/572.1 |
| 2005/0064855 | A1 * | 3/2005 | Russell ........................ 455/417 |
| 2006/0043201 | A1 * | 3/2006 | Vesikivi et al. .............. 235/492 |
| 2006/0121916 | A1 * | 6/2006 | Aborn et al. ............... 455/456.5 |
| 2009/0036165 | A1 * | 2/2009 | Brede ........................ 455/558 |

FOREIGN PATENT DOCUMENTS

| CN | 1620182 | 5/2005 |
| KR | 1020050024091 | 3/2005 |
| KR | 1020050049065 | 5/2005 |
| KR | 10-2006-0079885 | 7/2006 |
| WO | WO0103464 | 1/2001 |
| WO | WO 01/45319 | 6/2001 |
| WO | WO 2005/091997 | 10/2005 |

* cited by examiner

*Primary Examiner* — David Bilodeau
(74) *Attorney, Agent, or Firm* — The Farrell Law Firm, P.C.

(57) ABSTRACT

Disclosed are an apparatus and a method for changing an operation mode of a dual mode terminal by synchronizing a radio frequency identification (RFID) system with a terminal RFID reader and/or a terminal TFID tag. The RFID system includes an RFID tag and/or an RFID reader is installed in a specific area, or in a predetermined area or an entrance/exit of a building provided with a WiFi service. The terminal RFID reader and/or the terminal RFID tag are installed in the dual mode terminal providing a WiFi service and a mobile communication service. Accordingly, the present invention provides advantages of saving power consumption and improving user convenience.

20 Claims, 8 Drawing Sheets

| RFID INFORMATION (11) | WIFI FLAG (13) |
|---|---|

| RFID SYSTEM ID (21) | DUAL MODE TERMINAL FOR WIFI / MOBILE COMMUNICATION (23) | CONTROL COMMAND DISPLAY FLAG (25) | MESSAGE CONTENT INCLUDE WIFI FLAG (27) |
|---|---|---|---|

20

APPARATUS AND METHOD FOR CHANGING OPERATION MODE OF DUAL MODE TERMINAL

PRIORITY

This U.S. non-provisional application claims priority under 35 U.S.C. §119 from Korean Patent Application No. 2006-0004094, which was filed in the Korean Intellectual Property Office on Jan. 13, 2006, the contents of which are incorporated herein by reference.

BACKGROUND OF THE INVENTION

1. Field of the Invention

The present invention relates to an apparatus and a method for changing an operation mode of a dual mode terminal, and in particular, to an apparatus and a method for automatically changing an operation mode of a dual mode terminal between a service provided in a specific area (for example, a WiFi service) and a mobile communication service.

2. Description of the Prior Art

WiFi (wireless fidelity) is an alias of a wireless LAN, and connotates that a wireless network can be used as conveniently as a high-fidelity (HiFi) audio system. The wireless LAN may provide a communication service such as the Internet to wireless terminals (for example, a personal digital assistant and a notebook computer) located within a predetermined distance from a wireless access point. The service range of the wireless LAN was initially as small as 10 meters, and has been extended up to 50 to several hundred meters. Additionally, a data transfer rate of the wireless LAN has been increased up to 4 to 11 Mbps, and thereby has enabled transmission/reception of large size multimedia content. Accordingly, the wireless LAN is used to provide a high-speed data service to clients located in a building such as a school, airport, and hotel.

As the wireless LAN service is commercialized, dual mode terminals providing a WiFi service and a mobile communication service are being developed to provide the wireless LAN service. That is, the dual mode terminals are being developed to provide both WiFi and mobile communication services.

The dual mode terminal includes a WiFi module for a WiFi service and a mobile communication module (for example, a CDMA module) for a mobile communication service. When inside a WiFi service area, the dual mode terminal operates in a WiFi service mode. When outside the WiFi service area, the dual mode terminal operates in a mobile communication service mode. In order to accomplish this mode change, a user must manually change the operation mode of the terminal whenever entering or leaving a WiFi service area.

Additionally, in the case of a dual mode terminal including a plurality of operation modes, power must be supplied to all the devices related to individual operation modes so that the operation mode can be changed by identifying movement from one service area to another service area. This raises issues of wasted power resources. For example, when WiFi and mobile communication modules are both switched on in the dual mode terminal supporting the WiFi and mobile communication services, a great amount of power is needed to operate both modules.

SUMMARY OF THE INVENTION

An aspect of the present invention is to provide an apparatus and a method to save power consumption in a dual mode terminal by supplying the power only to a desired component corresponding to an operation mode of the dual mode terminal.

Another aspect of the present invention is to provide an apparatus and a method to automatically change the operation mode of a dual mode terminal.

Another aspect of the present invention is to provide a dual mode terminal supplied with the above apparatus and method.

In order to achieve at least the above aspects, a method of changing an operation mode of a dual mode terminal having a first communication unit operating in a first service area includes receiving a signal to identify entering into the first service area from a system in the first service area; and supplying power to the first communication unit according to the signal and switching to a first operation mode.

In order to achieve at least the above aspects, a method of changing an operation mode of a dual mode terminal having a first communication unit operating in a first service area includes receiving first RFID tag information from a system in the first service area; and changing the operation mode according to the first RFID tag information.

In order to achieve at least the above aspects, a method of changing an operation mode of a dual mode terminal having a first communication unit operating in a first service area includes transmitting second RFID tag information to a system in the first service area; receiving a signal of changing an operation mode transmitted by the system in the first service area; and changing the operation mode according to the signal of changing an operation mode.

In order to achieve at least the above aspects, another method of changing an operation mode of a dual mode terminal having a first communication unit operating in a first service area includes receiving second RFID tag information from the terminal; transmitting a signal of changing an operation mode in a RFID tag format to the terminal, if the terminal includes an RFID tag reader; and transmitting a signal of changing an operation mode in a short message format through a mobile communication base station, if the terminal does not include an RFID tag reader.

In order to achieve at least the above aspects, an operation mode changing apparatus for a dual mode terminal corresponding to service areas includes a first RFID tag unit for outputting first RFID tag information in a first service area; and an operation mode control unit, installed in the terminal, for controlling the operation mode of the terminal according to the first RFID tag information.

In order to achieve at least the above aspects, an operation mode changing apparatus for a dual mode terminal corresponding to service areas includes a reader for receiving second RFD tag information transmitted by the terminal in a first service area; an operation mode change signal output unit for outputting a signal of changing an operation mode of the terminal according to the second RFID tag information; and an operation mode control unit, installed in the terminal, for controlling the operation mode of the terminal according to the signal of changing an operation mode.

In order to achieve at least the above aspects, a dual mode terminal changing an operation mode includes a first communication unit operating in a first service area; a second communication unit operating in at least one of the first service area and another area; a reader for detecting first RFID tag information transmitted by a system in the first service area; and a control unit for changing the operation mode of the dual mode terminal in response to the reception of the first RFID tag information.

In order to achieve at least the above aspects, a dual mode terminal changing an operation mode includes a first communication unit operating in a first service area; a second communication unit operating in at least one of the first service area and another area, for receiving a signal of changing an operation mode; a second RFID tag unit for outputting second RFID tag information including information on the operation mode of the terminal; a reader for receiving the signal of changing the operation mode of the terminal; and a control unit for changing the operation mode of the terminal in response to the signal of changing an operation mode.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF THE PREFERRED EMBODIMENTS

Hereinafter, example embodiments of the present invention are described in detail with reference to the accompanying drawings. The same reference numbers are used for the same or like components in the accompanying drawings. Additionally, detailed explanations for well-known functions and compositions are omitted for the sake of clarity and conciseness.

The present invention provides an apparatus and a method for changing an operation mode of a dual mode terminal by synchronizing a radio frequency identification (here after referred to as an 'RFID') system with a terminal RFID reader and/or a terminal RFID tag. The RFID system includes an RFID tag and/or an RFID reader installed in a specific area or in a predetermined area or an entrance/exit of a building provided with a WiFi service. The terminal RFID reader and/or terminal RFID tag are installed in a dual mode terminal providing a WiFi service and a mobile communication service. The present invention provides an apparatus and a method for changing an operation mode of a dual mode terminal, identifying whether the dual mode terminal enters or leaves a WiFi service area by synchronizing an RFID system with a terminal RFID reader and/or a terminal RFID tag, and switching on or off a WiFi module installed in the dual mode terminal according to the identification result.

The dual mode terminal according to the present invention includes a WiFi module and a mobile communication module including, respectively, a WiFi modem and a mobile communication modem (hereinafter, as a 'CDMA modem').

Figure 1:
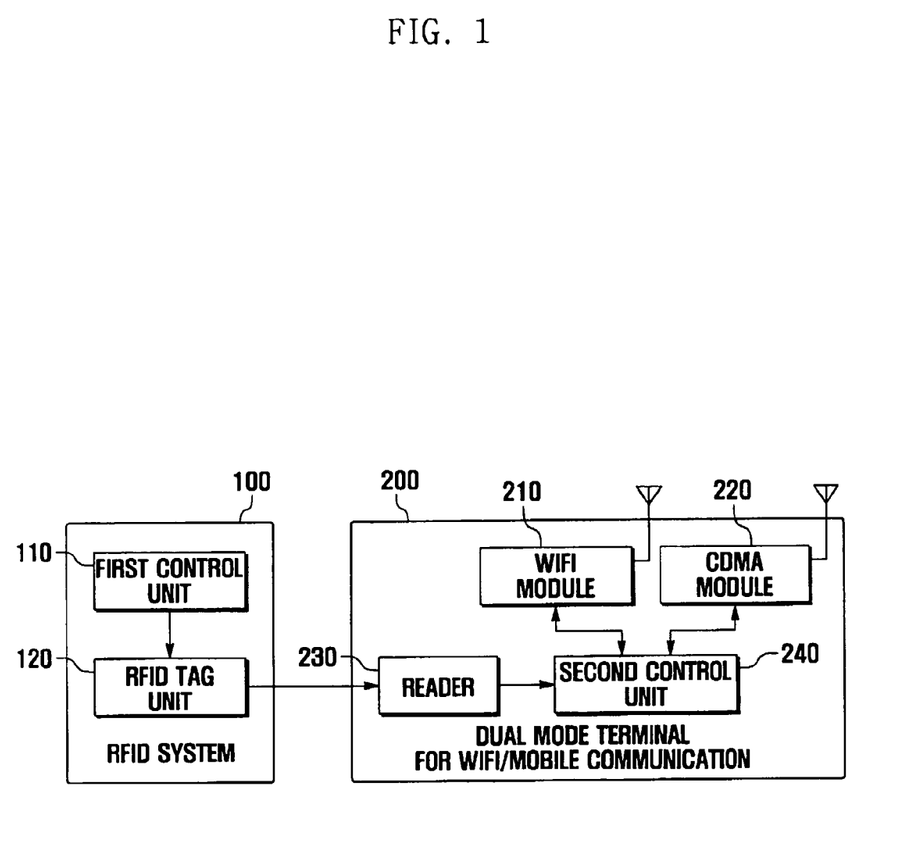
FIG. 1 is a block diagram illustrating an example of a system configuration of an apparatus for changing an operation mode of a dual mode terminal, according to the present invention.

FIG. 1 is a block diagram illustrating an example of a system configuration of an apparatus for changing an operation mode of a dual mode terminal, according to a first embodiment of the present invention. Referring to FIG. 1, an operation mode changing apparatus for a dual mode terminal 200 providing a WiFi service and a mobile communication service (hereafter referred to as a 'dual mode terminal') includes an RFID system 100 for generating RFID tag information and transmitting the information to the dual mode terminal 200 for the control of the dual mode terminal 200.

The RFID system 100 includes a first control unit 110 and an RFID tag unit 120.

The RFID tag unit 120 is controlled by the first control unit 110, generates RFID tag information for the control of the operation mode of the dual mode terminal 200, and transmits the information to the dual mode terminal 200. Preferably, the RFID tag unit 120 generates and stores the RFID tag information, and automatically transmits the RFID tag information to the dual mode terminal 200, when the dual mode terminal 200 approaches the RFID tag unit 120. Preferably, the RFID tag unit 120 is installed at entrances and exits of a WiFi service area, switched on by radio frequency waves generated by the dual mode terminal 200 passing through an entrance or exit, retrieves pre-stored RFID tag information, and transmits the RFID tag information to the dual mode terminal 200.

The dual mode terminal 200 includes a WiFi module 210 for a WiFi service, a CDMA module 220 for a mobile communication service, a reader 230 for retrieving RFID tag information from an RFID system 100, and a second control unit 240 for controlling the operation of the WiFi module 210 and CDMA module 220 according to a signal transmitted by the reader 230.

The reader 230 retrieves RFID tag information from the RFID tag unit 120. The reader 230 preferably generates radio frequency waves, and retrieves RFID tag information from the RFID tag unit 120 by communicating with the RFID tag unit 120 when the dual mode terminal 200 approaches the RFID tag unit 120 within a predetermined range (for example, within 1.8 m). Subsequently, the reader 230 transmits the RFID tag information to the second control unit 240. The reader 230 preferably transmits the RFID tag information in real time.

The second control unit 240 identifies the operation of the WiFi module 210 by detecting the transmission of the RFID tag information from the reader 230, and controls the operation of the WiFi module 210 according to the result. For example, by identifying the operation of the WiFi module 210 when RFID tag information is transmitted by the reader 230, the second control unit 240 switches off the WiFi module 210 if the WiFi module 210 is operating, and switches on the WiFi module 210 if the WiFi module 210 is not operating. Generally, the RFID tag information includes flag information on a communication service available in the corresponding area. Accordingly, the flag information may be included in RFID tag information transmitted to the second control unit 240. For example, the RFID tag information may include flag information indicating that the corresponding area is a WiFi service area. However, in the first embodiment of the present invention, the content of the RFID tag information is not important, because the RFID tag information in the first embodiment of the present invention serves to identify a passage through an entrance or exit in a specific area. Therefore, the second control unit 240 preferably does not read the content of the RFID tag information but detects only whether RFID tag information is received by the reader 230, and controls the operation of the WiFi module 210 according to the result. For this, the second control unit 240 preferably sets up a flag to indicate reception of RFID tag information, and identifies the operation of the WiFi module 210 by toggling the value of the flag according to the reception of the RFID tag information.

Figure 2:
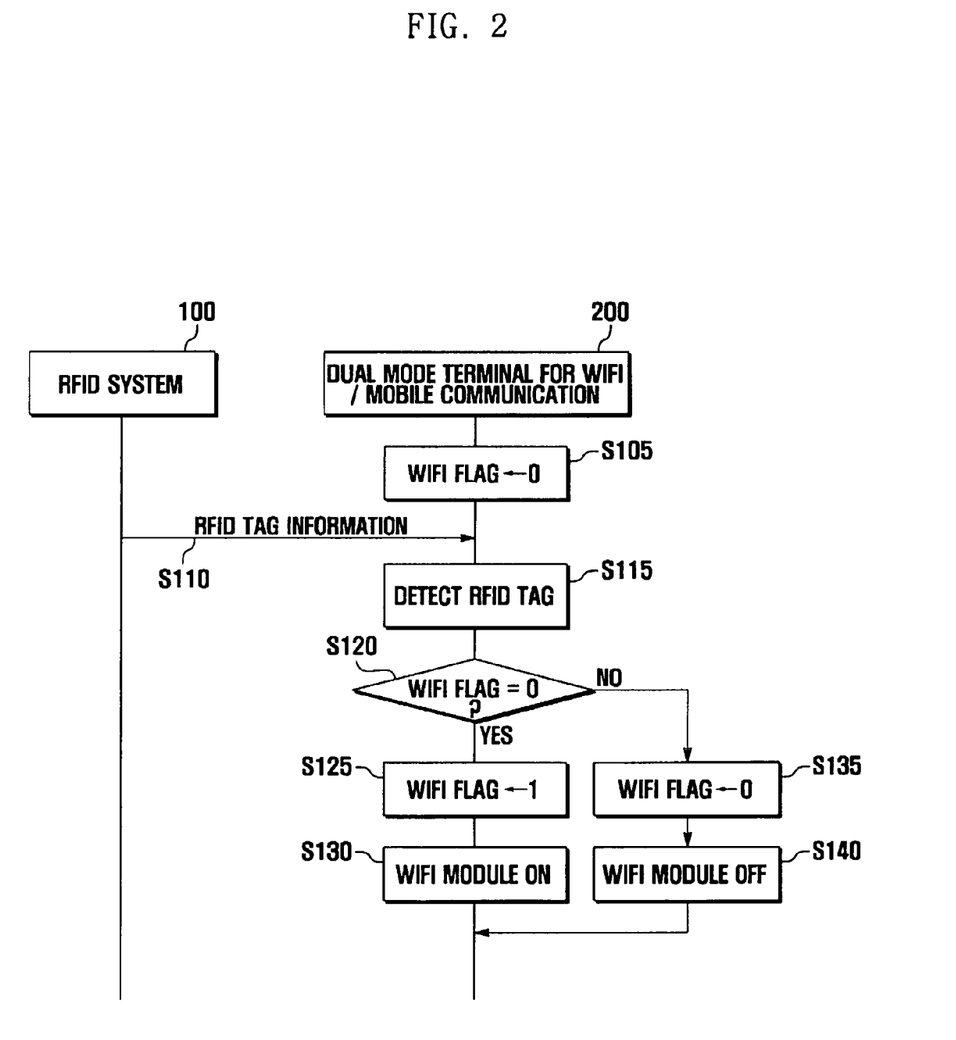
FIG. 2 is a flow chart illustrating a method of changing the operation mode of a dual mode terminal for the apparatus of FIG.

FIG. 2 is a flow chart illustrating a method of changing the operation mode of a dual mode terminal for the apparatus of FIG. 1. That is, FIG. 2 shows steps of the method of changing the operation mode of the dual mode terminal 200 by using the operation mode changing apparatus illustrated in FIG. 1.

Referring to FIG. 2, in step S105, the dual mode terminal 200 initializes an indication value (i.e. a 'WiFi flag') indicating an operation status of the WiFi module 210. For example, the WiFi flag is set to '0'. At this moment, the initial value of the WiFi flag preferably indicates that the status of the WiFi module 210 of the dual mode terminal 200 is not in operation. That is, the initial value of the WiFi flag preferably indicates a state that the dual mode terminal 200 is not located in a WiFi service area.

If RFID tag information is transmitted by the RFID system 100 installed at an entrance or exit of a WiFi service area by passing the dual mode terminal 200 through the entrance or exit in step S110, the dual mode terminal 200 receives the RFID tag information by using the reader 230 installed in the dual mode terminal 200 in step S115. The RFID tag information may include various kinds of information referenced by the dual mode terminal 200. However, in the first embodiment of the present invention, the content of the RFID tag information is not important. The reason is the same as explained in the description of FIG. 1. Accordingly, the dual mode terminal 200 does not read the content of the RFID tag information but only identifies the current value of the WiFi flag in step S120, and switches on or off the WiFi module 210 according to the result.

That is, the dual mode terminal 200 receiving the RFID tag information in step S115 detects the current value of the WiFi flag in step S120. If the value of the WiFi flag is '0' in step S120, the dual mode terminal 200 changes the value of the WiFi flag to '1' in step S125, and switches on the WiFi module 210 in step S130. Reception of RFID tag information in the state that the current value of the WiFi flag is '0' means that the dual mode terminal 200 has just entered a WiFi service area from an area where the WiFi service is not provided.

On the other hand, according to the check result in step 120, if the current value of the WiFi flag is not '0', the dual mode terminal 200 changes the value of the WiFi flag to '0' in step S135, and switches off the WiFi module 210 in step S140. Reception of RFID tag information in the state that the current value of the WiFi flag is '1' means that the dual mode terminal 200 has just left the WiFi service area.

As described above, in the first embodiment of the present invention, the dual mode terminal 200 retrieves RFID tag information from the RFID tag unit 120 installed in a WiFi service area through the reader 230. Subsequently, the dual mode terminal 200 identifies entrance to a WiFi service area or departure from the WiFi service area, and correspondingly changes the operation mode to a WiFi operation mode or mobile communication operation mode.

When the operation mode of the dual mode terminal 200 is changed from a mobile communication operation mode to a WiFi operation mode, power of the CDMA module 220 may be switched off or switched on. That is, in the case of the WiFi module 210 of the dual mode terminal 200, the power is switched on only in a WiFi service area. However, power to the CDMA module 220 may be switched on in all service areas. Accordingly, in the case of the CDMA module 220, maintaining the power switched on in all the service areas is preferably set as a default value and the power of the CDMA module 220 may be set to be switched off in the WiFi service area according to a user setting.

Figure 3:
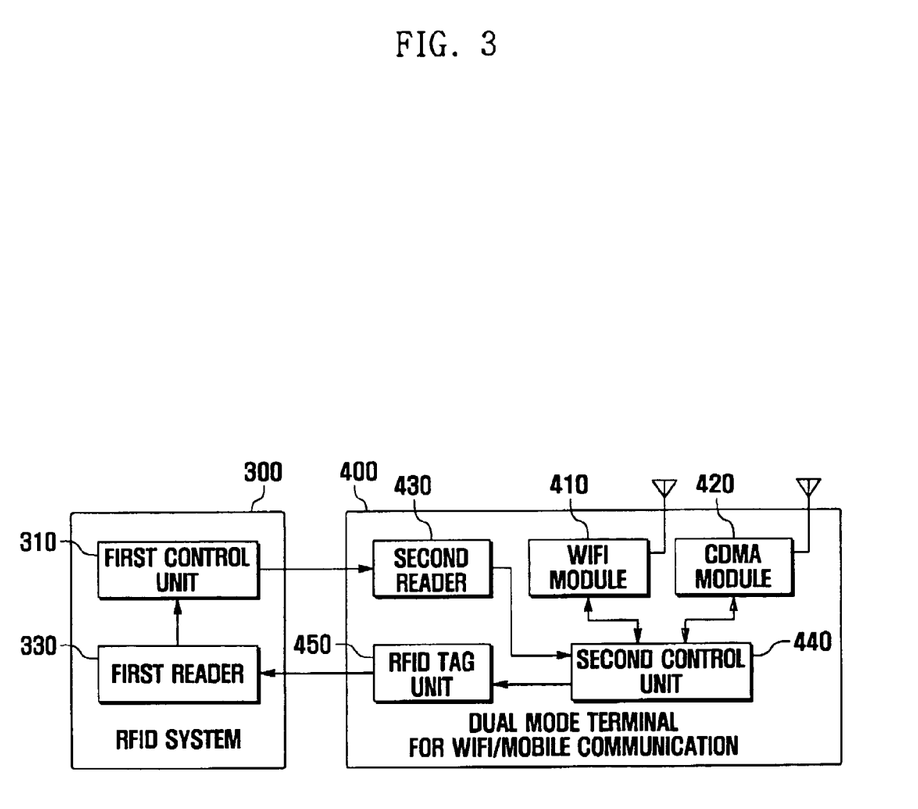
FIG. 3 is a block diagram illustrating an example of a system configuration of an apparatus for changing an operation mode of a dual mode terminal, according to the present invention operation mode.

FIG. 3 is a block diagram illustrating an example of a system configuration of an apparatus for changing an operation mode of a dual mode terminal, according to a second embodiment of the present invention. Referring to FIG. 3, an operation mode changing apparatus for a dual mode terminal 400 providing a WiFi service and a mobile communication service includes an RFID system 300 for outputting a WiFi control signal in response to RFID tag information transmitted by the dual mode terminal 400.

The RFID system 300 includes a first control unit 310 and a first reader 330.

The first reader 330 retrieves. RFID tag information from an dual mode terminal 400. For this, the first reader 330 preferably retrieves RFID tag information from the RFID tag unit 450 of the dual mode terminal 400 by generating radio frequency waves and by communicating with the dual mode terminal 400 (especially with the RFID tag unit 450) when the dual mode terminal 400 approaches within a predetermined range (for example, within 1.8 m). The first reader 330 is preferably installed at an entrance and an exit of a WiFi service area, and retrieves RFID tag information from the RFID tag unit 450 of the dual mode terminal 400 passing through the entrance and exit. The first reader 330 transmits the retrieved RFID tag information to the first control unit 310. The RFID tag information retrieved from the dual mode terminal 400 preferably includes a signal indicating the operation status of a WiFi module 410 (i.e. a WiFi flag).

Subsequently, the first control unit 310 transmits a WiFi control signal to the dual mode terminal 400 in response to the RFID tag information transmitted by the first reader 330. The first control unit 310 preferably generates and transmits the WiFi control signal in an RFID tag format. Specifically, the first control unit 310 preferably receives RFID tag information including a signal (i.e. a WiFi flag) indicating an operation status of the WiFi module 410 from the first reader 330, and generates and transmits a signal for controlling the operation of the WiFi module 410 with reference to the RFID tag information. For example, the first control unit 310 analyzes the RFID tag information transmitted by the first reader 330. If the value of the WiFi flag is '0', the first control unit 310 identifies that the WiFi module 410 is currently switched off, and generates and transmits a control signal for switching on the WiFi module 410. If the value of the WiFi flag is '1', the first control unit 310 identifies that the WiFi module 410 is currently switched on, and generates and transmits a control signal for switching off the WiFi module 410. When switching on the WiFi module 410, the first control unit 310 preferably sets the value of the WiFi flag to '1', and generates RFID tag information including the WiFi flag. When switching off the WiFi module 410, the first control unit 310 preferably sets the value of the WiFi flag to '0', and generates RFID tag information including the WiFi flag.

The dual mode terminal 400 includes the WiFi module 410 for a WiFi service, a CDMA module 420 for a mobile communication service, a second reader 430 for retrieving a control signal from the RFID system 300, a second control unit 440 for controlling the operation of the WiFi module 410 and CDMA module 420 corresponding to the control signal transmitted by the second reader 430, and an RFID tag unit 450 for transmitting a signal for indicating the operation mode of the dual mode terminal 400 to the RFID system 300 according to the control of the second control unit 440.

The RFID tag unit 450 preferably generates and stores RFID tag information for indicating an operation status of the WiFi module 410, and automatically transmits the RFID tag information to the RFID system 300 (specifically, to the first reader 330) when the RFID tag unit 450 approaches the RFID system 300. The RFID tag information preferably includes a signal (i.e. a WiFi flag) for indicating an operation status of the WiFi module 410. For example, the value of the WiFi flag is '0' if the WiFi module 410 is switched off, and the value of the WiFi flag is '1' if the WiFi module 410 is switched on.

The second reader 430 receives a feed back signal in an RFID tag format from the adjacent RFID system 300 (specifically, from the first control unit 310). For this, the second reader 430 preferably retrieves RFID tag information from the RFID system 300 by generating radio frequency waves and by communicating with the RFID system 300 when the dual mode terminal 400 approaches the RFID system 300. The RFID tag information preferably includes a signal (i.e. a WiFi flag) for controlling the operation of the WiFi module 410. Alternatively, the second reader 430 may receive a feed back signal in an RFID tag format transmitted by the RFID system 300. Subsequently, the second reader 430 transmits RFID tag information to the second control unit 440. At this moment, the second reader 430 preferably transmits the RFID tag information in real time.

The second control unit 440 receives RFID tag information including a signal for controlling the operation of the WiFi module 410 from the second reader 430, and controls the operation of the WiFi module 410 based on the RFID tag information. For this, the second control unit 440 preferably analyzes and identifies the value of the WiFi flag included in the RFID tag information transmitted by the second reader 430, and switches on or off the WiFi module 410 corresponding to the value. For example, the second control unit 440 switches on the WiFi module 410 if the value of the WiFi flag is '1', and switches off the WiFi module 410 if the value of the WiFi flag is '0'.

Figure 4:
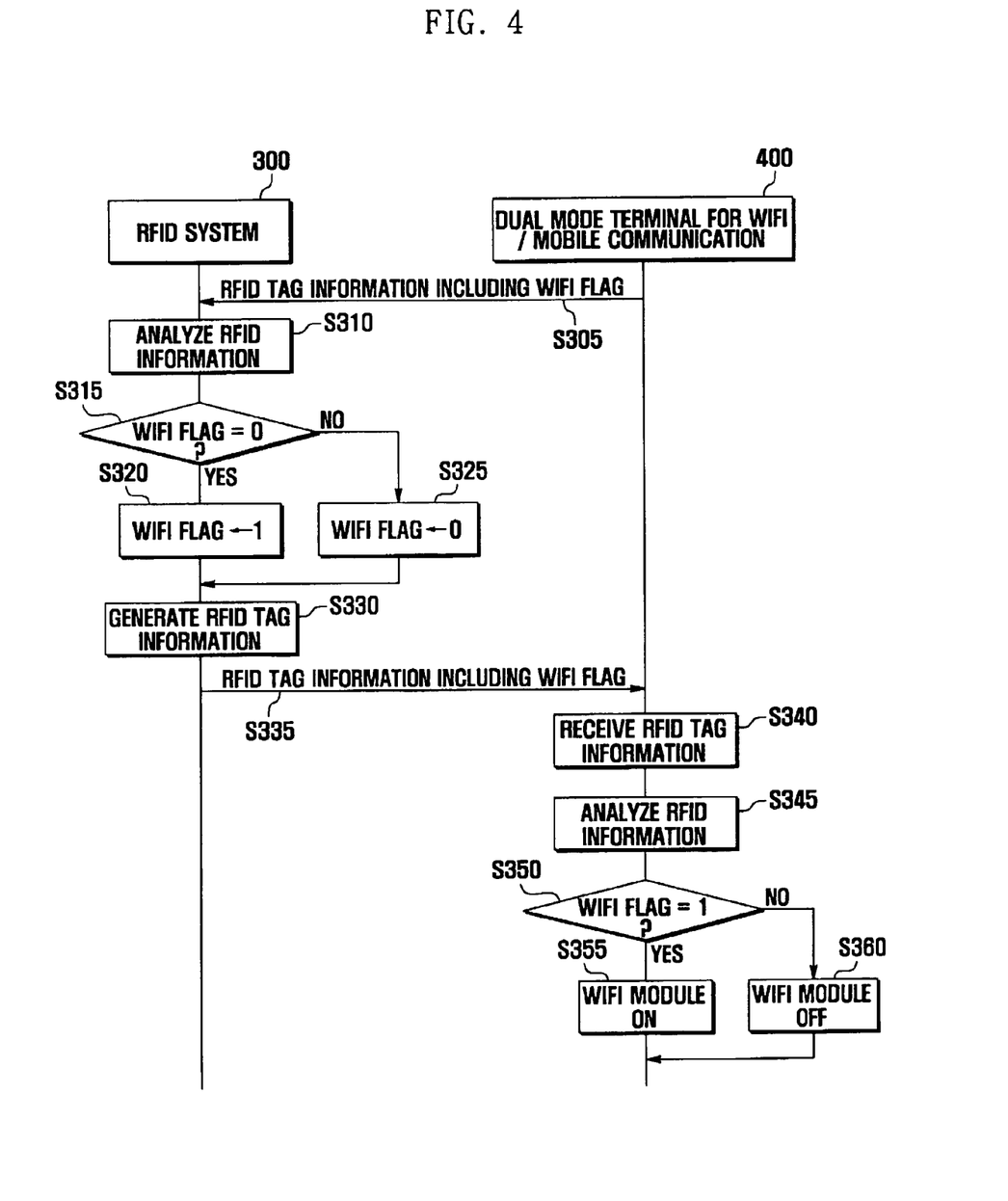
FIG. 4 is a flow chart illustrating a method of changing the operation mode of a dual mode terminal for the apparatus of FIG. 3.

FIG. 4 is a flow chart showing a method of changing the operation mode of a dual mode terminal for the apparatus of FIG. 3. That is, FIG. 4 shows steps of the method of changing the operation mode of the dual mode terminal 400 by using the operation mode changing apparatus illustrated in FIG. 3.

Referring to FIGS. 3 and 4, the method of changing the operation mode of a dual mode terminal according to the second embodiment of the present invention is described as follows.

First, in step S305, the dual mode terminal 400 generates and stores RFID tag information for indicating an operation status of the WiFi module 410, and transmits the RFID tag information to the RFID system 300 when the dual mode terminal 200 approaches the RFID system 300 installed at an entrance or an exit of a WiFi service area by passing through the entrance or exit. The RFID tag information preferably includes a signal (i.e. a WiFi flag) for indicating the operation status of the WiFi module 410. For example, the value of the WiFi flag is '0' if the WiFi module 410 is switched off, and the value of the WiFi flag is '1' if the WiFi module 410 is switched on.

Subsequently, the RFID system 300 analyzes the RFID tag information and thereby analyzes the operation status of the WiFi module 410 in step S310, and determines if the value of the WiFi flag included in the RFID tag information is '0' in step S315. According to the determination result in step S315, if the value of the WiFi flag is '0', the RFID system 300 identifies that the WiFi module 410 is switched off and generates a signal for switching on the WiFi module 410. If the value of the WiFi flag is '1', the RFID system 300 identifies that the WiFi module 410 is switched on and generates a signal for switching off the WiFi module 410. For this, the RFID system 300 sets the value of the WiFi flag to '1' to switch on the WiFi module 410 in step S320 if the value of the WiFi flag is '0', and sets the value of the WiFi flag to '0' to switch off the WiFi module 410 in step 325 if the value of the WiFi flag is '1'. In step S330, the RFID system 300 generates a control signal (a feed back signal) including a WiFi flag in an RFID tag format.

In step S335, the control signal in an RFID tag format is transmitted to the dual mode terminal 400.

Subsequently, the dual mode terminal 400 receives the RFID tag information through the second reader 430 in step S340, analyzes the value of the RFID tag information in step S345, and analyzes the value of the WiFi flag included in the RFID tag in step S350. This is for switching on or off the WiFi module 410 corresponding to the value of the WiFi flag included in the RFID tag information. According to the check result in step S350, the dual mode terminal 400 switches on the WiFi module 410 in step S355 if the value of the WiFi flag is '1', and switches off the WiFi module 410 in step S360 if the value of the WiFi flag is '0'.

As described above, in the second embodiment of the present invention, the RFID system 300 retrieves RFID tag information of the dual mode terminal 400 through the first reader 330, and identifies the operation mode of the dual mode terminal 400. The RFID system 300 generates a feed back signal in an RFID tag format to control the operation mode, and transmits the signal to the dual mode terminal 400. The dual mode terminal 400 identifies the entrance to a WiFi service area or the departure from the WiFi service area by receiving the feed back signal through the second reader 430, and changes the operation mode to a WiFi operation mode or a mobile communication operation mode.

When the operation mode of the dual mode terminal 400 is changed from a mobile communication operation mode to a WiFi operation mode, power of the CDMA module 420 may be switched off or switched on. That is, in the case of the WiFi module 410, the dual mode terminal 400 maintains a switched-on state only in a WiFi service area. However, in the case of the CDMA module 420, the dual mode terminal 400 may maintain a switched-on state in all service areas. Accordingly, in the case of the CDMA module 420, maintaining the power switched on in all the service areas is preferably set as a default value and the power of the CDMA module 420 may be set to be switched off according to a user setting.

Figure 5:
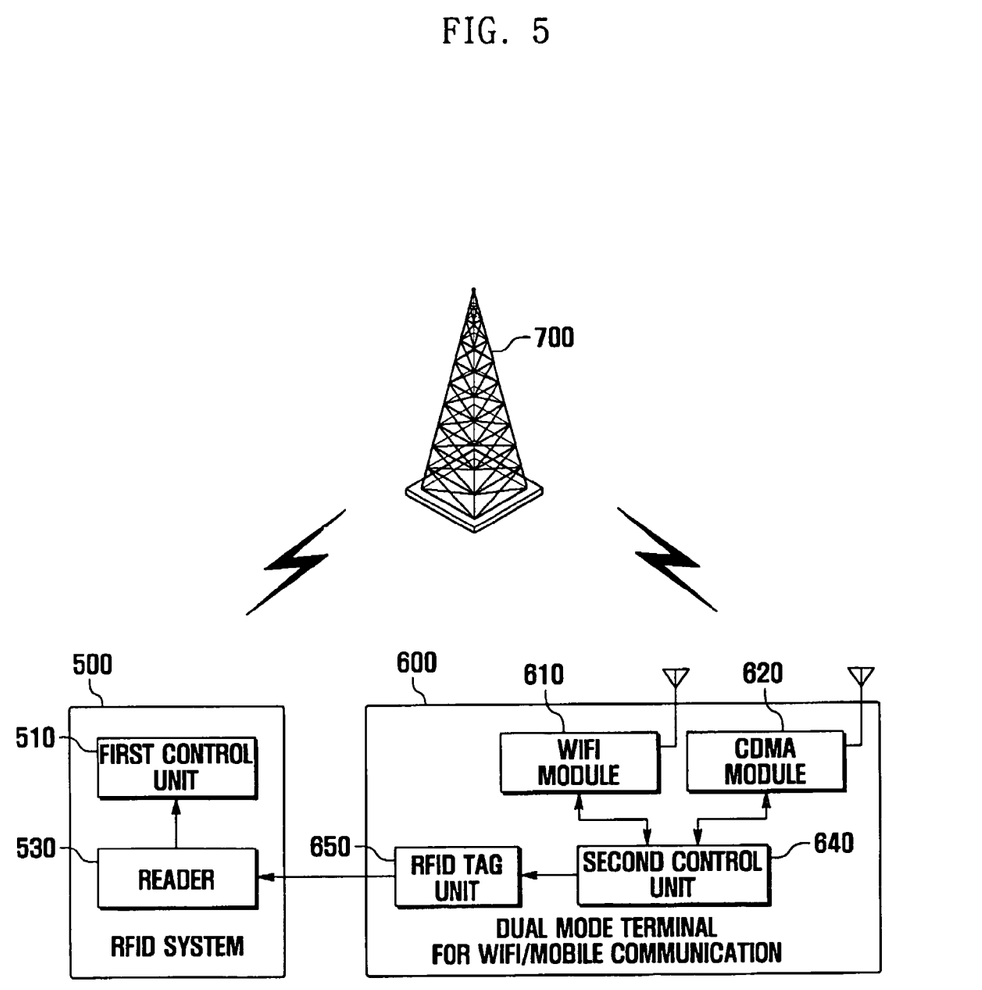
FIG. 5 is a block diagram illustrating an example of a system configuration of an apparatus for changing an operation mode of a dual mode terminal, according to the present invention.

FIG. 5 is a block diagram illustrating an example of a system configuration of an apparatus for changing an operation mode of a dual mode terminal, according to a third embodiment of the present invention. Referring to FIG. 5, an operation mode changing apparatus for a dual mode terminal 600 providing a WiFi service and a mobile communication service includes an RFID system 500 for outputting a WiFi module control signal in response to RFID tag information transmitted by the dual mode terminal 600. The RFID system 500 transmits the WiFi module control signal through a base station 700.

For this, the RFID system 500 includes a first control unit 510 and a reader 530, and the WiFi module control signal is preferably generated in a short message format.

The reader 530 retrieves RFID tag information from the adjacent dual mode terminal 600. The reader 530 preferably retrieves RFID tag information from an RFID tag unit 650 of the dual mode terminal 600 by generating radio frequency waves and by communicating with the dual mode terminal 600 (specifically, with the RFID tag unit 650) when the dual mode terminal 600 approaches within a predetermined range (for example, within 1.8 m). The reader 530 is preferably installed at an entrance and an exit of a WiFi service area, and retrieves RFID tag information from the RFID tag unit 650 of the dual mode terminal 600 passing through an entrance or an exit. The reader 530 transmits the retrieved RFID tag information to the first control unit 510. The RFID tag information retrieved from the dual mode terminal 600 preferably includes a signal indicating an operation status of a WiFi module 610 (i.e. a WiFi flag).

Subsequently, the first control unit 510 transmits a WiFi control signal to the dual mode terminal 600 in response to the RFID tag information transmitted by the reader 530. The first control unit 510 preferably generates the WiFi module control signal in a short message format, and transmits the signal to the dual mode terminal 600 through the base station 700. Specifically, the first control unit 510 preferably receives from the reader 530 RFID tag information including a signal (i.e. a WiFi flag) indicating the operation status of the WiFi module 610, and generates and transmits a signal for controlling the operation of the WiFi module 610 with reference to the RFID tag information. For example, the first control unit 510 analyzes the RFID tag information transmitted by the reader 530. The first control unit 510 determines that the WiFi module 610 is currently switched off if the value of the WiFi flag is '0', and generates and transmits a control signal for switching on the WiFi module 610. If the value of the WiFi flag is '1', the first control unit 510 determines that the WiFi module 610 is currently switched on, and generates and transmits a control signal for switching off the WiFi module 610. When switching on the WiFi module 610, the first control unit 510 preferably sets the value of the WiFi flag to '1', and generates a short message including a WiFi flag. When switching off the WiFi module 610, the first control unit 510 preferably sets the value of the WiFi flag to '0', and generates a short message including a WiFi flag. Subsequently, the short message is transmitted to the base station 700. Preferably, the reader 530 receives RFID tag information including the telephone number of the dual mode terminal from the dual mode terminal 600, and the first control unit 510 requests from the base station 700 transmission of a short message including a WiFi flag by using the telephone number. The short message is preferably not text identifiable by a user but a system code mutually predetermined between the base station 700 and the dual mode terminal 600. For example, the short message is preferably configured such that the dual mode terminal 600 receiving a short message can change an operation mode of the dual mode terminal 600 by applying the system code included in the short message.

The dual mode terminal 600 includes the WiFi module 610 for a WiFi service, a CDMA module 620 for receiving a short message including a WiFi flag from the base station 700 and outputting a control signal for the control of the WiFi module 610 according to the WiFi flag, a second control unit 640 for controlling the operation of the WiFi module 610 corresponding to the control signal transmitted by the CDMA module 620, and the RFID tag unit 650 for transmitting a signal for indicating the operation mode of the dual mode terminal 600 to the RFID system 500 according to the control of the second control unit 640.

The RFID tag unit 650 preferably generates and stores RFID tag information for indicating an operation status of the WiFi module 610, and automatically transmits the RFID tag information to the RFID system 500 (specifically, to the reader 530) when the RFID tag unit 650 approaches the RFID system 500. The RFID tag information preferably includes a signal (i.e. a WiFi flag) for indicating the operation status of the WiFi module 610 and the telephone number of the dual mode terminal 600. For example, the value of the WiFi flag is '0' if the WiFi module 610 is switched off. The value of the WiFi flag is '1' if the WiFi module 610 is switched on, and the RFID tag information preferably includes the above values.

The CDMA module 620 receives a short message from the base station 700, and transmits the short message to the second control unit 640.

The second control unit 640 receives the short message from the CDMA module 620, and analyzes the short message. According to the result of the analysis, if the short message includes a signal for controlling the operation of the WiFi module 610, the second control unit 640 controls the operation of the WiFi module 610 referring to the signal. For this, the second control unit 640 preferably analyzes the value of the WiFi flag included in the short message, and switches on or off the WiFi module 610 corresponding to the value. For example, the second control unit 640 switches on the WiFi module 610 if the value of the WiFi flag is '1', and switches off the WiFi module 610 if the value of the WiFi flag is '0'.

Figure 6:
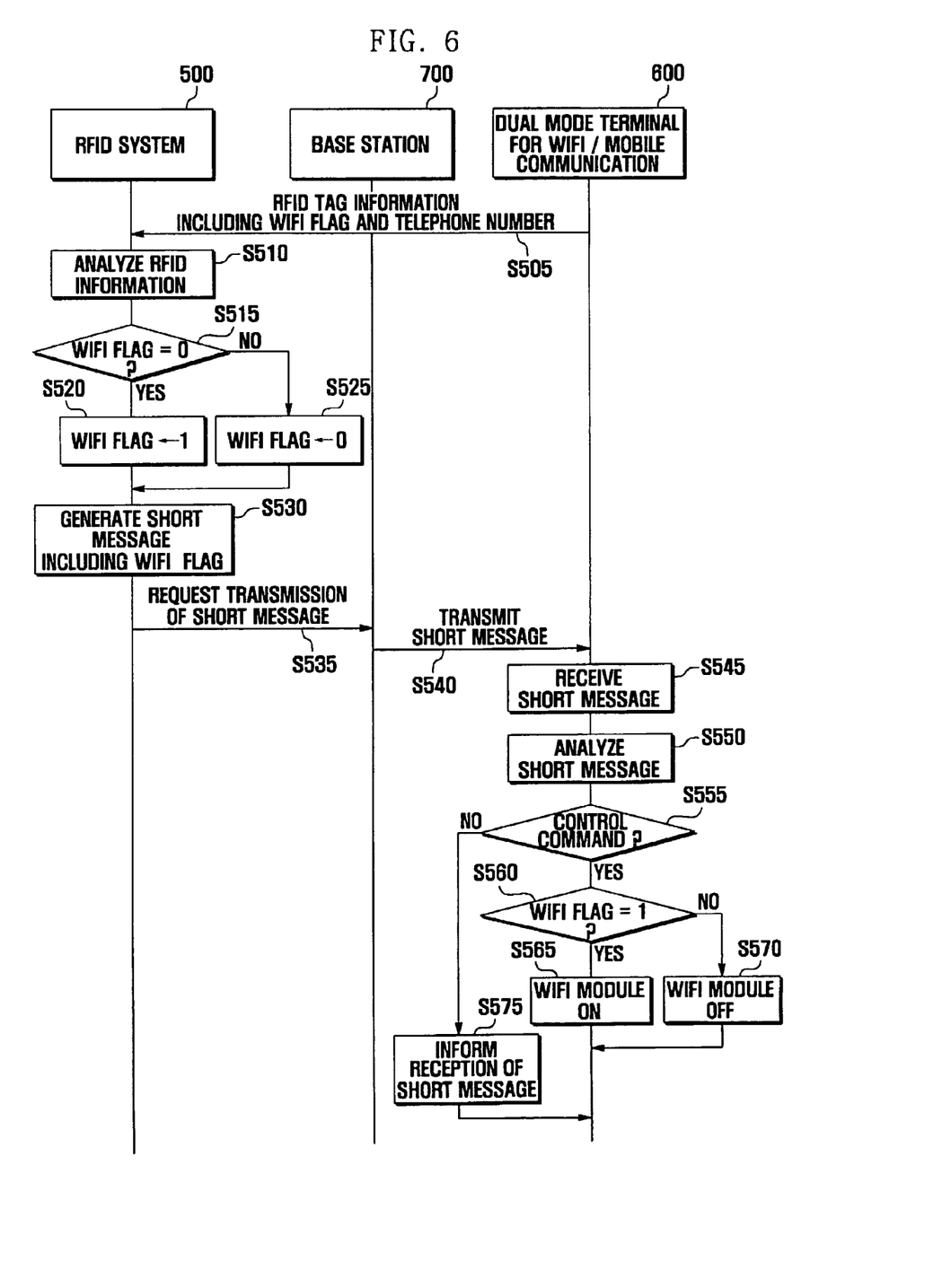
FIG. 6 is a flow chart illustrating a method of changing the operation mode of a dual mode terminal for the apparatus of FIG. 5.

FIG. 6 is a flowchart showing a method of changing the operation mode of a dual mode terminal for the apparatus of FIG. 5.

Referring to FIGS. 5 and 6, the method of changing the operation mode of a dual mode terminal according to the third embodiment of the present invention is described as follows.

Firstly, in step S505, the dual mode terminal 600 generates and stores RFID tag information for indicating an operation status of the WiFi module 410, and transmits the RFID tag information to the RFID system 500 when the dual mode terminal 600 approaches the RFID system 500 installed at an entrance and an exit of a WiFi service area by passing through the entrance or exit. The RFID tag information preferably includes a signal (i.e. a WiFi flag) for indicating the operation status of the WiFi module 610 and the telephone number of the dual mode terminal 600. For example, the value of the WiFi flag is '0' if the WiFi module 610 is switched off, the value of the WiFi flag is '1' if the WiFi module 610 is switched on, and the RFID tag information preferably includes the above values.

Subsequently, the RFID system 500 analyzes the RFID tag information and thereby identifies the operation status of the WiFi module 610 in step S510, and determines if the value of the WiFi flag included in the RFID tag is '0' in step S515. According to the determination result in step S515, if the value of the WiFi flag is '0', the RFID system 500 identifies that the WiFi module 610 is switched off, and generates a signal for switching on the WiFi module 610. If the value of the WiFi flag is '1', the RFID system 500 identifies that the WiFi module 610 is switched on, and generates a signal for switching off the WiFi module 610. For this, the RFID system 500 sets the value of the WiFi flag to '1' to switch on the WiFi module 610 in step S520 if the value of the WiFi flag is '0', and sets the value of the WiFi flag to '0' to switch off the WiFi module 610 in step S525 if the value of the WiFi flag is not '0'. In step S530, the RFID system 300 generates a short message including a WiFi flag.

In steps S535 and S540, the short message is transmitted to the dual mode terminal 600 through the base station 700.

Subsequently, the dual mode terminal 600 receives the short message through the CDMA module 620 in step S545, analyzes the short message and determines if the short message is a control command in step S555. If the short message is a control command, the dual mode terminal identifies the value of the WiFi flag included in the short message in step S560. This is for switching on or off the WiFi module 610 corresponding to the value of the WiFi flag included in the short message. According to the determination result in step S560, the dual mode terminal 600 switches on the WiFi module 610 in step S565 if the value of the WiFi flag is '1', and switches off the WiFi module 610 in step S570 if the value of the WiFi flag is '0'.

According to the determination result in step S555, if the short message received from the CDMA module 620 is not a control command, the dual mode terminal 600 signals the reception of the short message in step S575. For example, a short message or a window informing the reception of the short message is displayed on a display unit of the dual mode terminal 600.

As described above, in the third embodiment of the present invention, the RFID system 500 retrieves RFID tag information of the dual mode terminal 600 through the reader 530, and identifies the operation mode of the dual mode terminal 600. The RFID system 500 generates a feedback signal in a short message format to control the operation mode, and transmits the signal to the dual mode terminal 600 through the base station 700. The dual mode terminal 600 identifies entrance to a WiFi service area or departure from the WiFi service area by receiving the feed back signal through the CDMA module 620, and changes the operation mode to a WiFi operation mode or a mobile communication operation mode.

When the operation mode of the dual mode terminal 600 is changed from a mobile communication operation mode to a WiFi operation mode, power of the CDMA module 420 may be switched off or switched on. That is, in the case of the WiFi module 610, the dual mode terminal 600 maintains a switched-on state only in a WiFi service area. However, in the case of the CDMA module 620, the dual mode terminal 600 may maintain the switched-on state in all service areas. Accordingly, in the case of the CDMA module 620, maintaining the power switched on in all the service areas is preferably set as a default value and the power of the CDMA module 620 may be set to be switched off according to a user setting.

Figure 7:
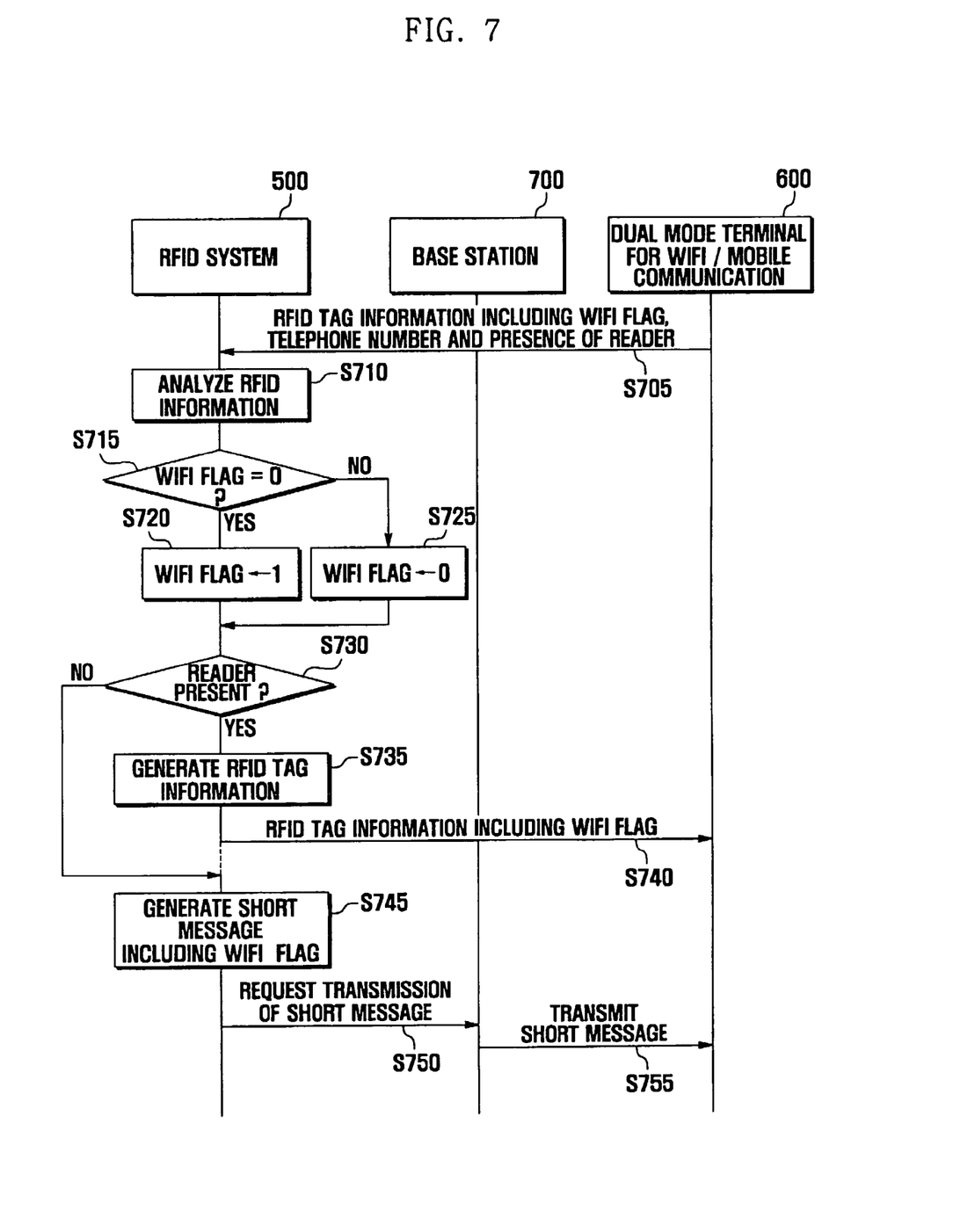
FIG. 7 is a flow chart illustrating a method of changing an operation mode of a dual mode terminal, according to the present invention.

FIG. 7 is a flow chart showing a method of changing an operation mode of a dual mode terminal, according to a fourth embodiment of the present invention. FIG. 7 shows a combined example of the second and third embodiments of the present invention, which transmits a control signal by selecting the type of a control signal for controlling the operation of a WiFi module in the dual mode terminal according to RFID tag information transmitted by the dual mode terminal. That is, the control signal is transmitted in an RFID tag format in the case that the dual mode terminal includes a reader, and the control signal is transmitted in a short message format in the case that the dual mode terminal does not include a reader.

Referring to FIG. 7, in step S705, the dual mode terminal 600 generates and stores RFID tag information for indicating an operation status of the WiFi module 610, and transmits the RFID tag information to the RFID system 500 when the dual mode terminal 600 approaches the RFID system 500 installed at an entrance and an exit of a WiFi service area by passing through the entrance or exit. The RFID tag information preferably includes a signal (i.e. a WiFi flag) for indicating the operation status of the WiFi module 610, the telephone number of the dual mode terminal 600, and information on the presence of a reader in the dual mode terminal 600. For example, the value of the WiFi flag is '0' if the WiFi module 410 is switched off, and the value of the WiFi flag is '1' if the WiFi module 410 is switched on. Therefore, the RFID tag information preferably includes the above values. Additionally, the RFID tag information further includes a reader flag indicating the presence of a reader. The value of the reader flag is preferably set to '1' if a reader is installed, and the value of the reader flag is set to '0' if no reader is installed.

Subsequently, the RFID system 500 analyzes the RFID tag information and thereby identifies the operation status of the WiFi module 610 in step S710, and determines if the value of the WiFi flag included in the RFID tag information is '0' in step S715. According to the determination result in step S715, if the value of the WiFi flag is '0', the RFID system 500 identifies that the WiFi module 610 is switched off, and generates a signal for switching on the WiFi module 610. If the value of the WiFi flag is '1', the RFID system 500 identifies that the WiFi module 610 is switched on, and generates a signal for switching off the WiFi module 610. For this, the RFID system 500 sets the value of the WiFi flag to '1' to switch on the WiFi module 610 in step S720 if the value of the WiFi flag is '0', and sets the value of the WiFi flag to '0' to switch off the WiFi module 610 in step 725 if the value of the WiFi flag is not '0'.

In step S730, the RFID system 500 determines if a reader is included in the dual mode terminal 600 according to the result of analyzing the RFID tag information. For example, according to the value of the reader flag, the RFID system 500 identifies that a reader is included in the dual mode terminal 600 if the value of the reader flag is '1', and identifies that a reader is not included in the dual mode terminal 600 if the value of the reader flag is '0'.

According to the determination result in step S730, if a reader is included in the dual mode terminal 600, the RFID system 500 generates RFID tag information including a WiFi flag in step S735, and transmits the RFID tag information to the dual mode terminal 600 in step S740.

According to the determination result in step S730, if a reader is not included in the dual mode terminal 600, the RFID system 500 generates a short message including a WiFi flag in step S745, and transmits the short message to the dual mode terminal 600 through the base station 700 in steps S750 and S755.

Subsequently, the dual mode terminal 600 controls the operation of the WiFi module 610 according to a control signal (an RFID tag or a short message) transmitted by the RFID system 500. In FIG. 7, a step of processing the control signal by the dual mode terminal 600 is omitted, because the dual mode terminal 600 performs steps S340 through S360 of FIG. 4 in the case that RFID tag information is received from an RFID system, and the dual mode terminal performs steps S545 through S575 of FIG. 6 in the case that a short message is received from an RFID system.

Figure 8A:
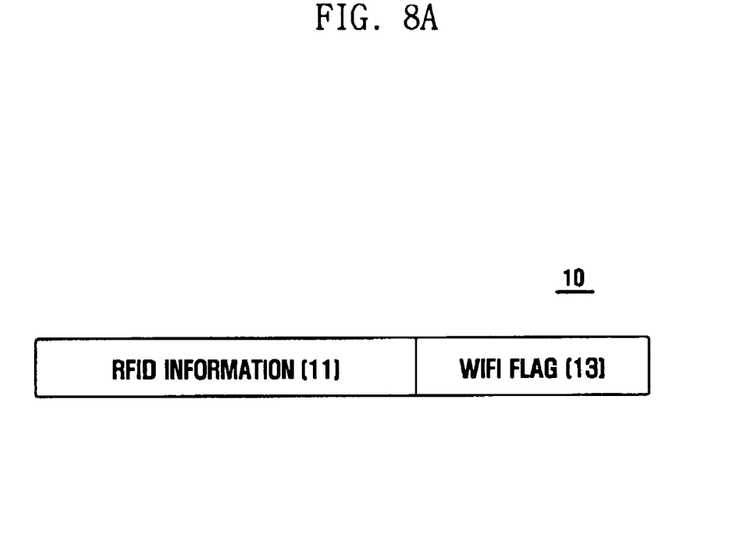
FIGS. 8A and 8B are diagrams illustrating examples of a structure of a message transmitted in the step of changing an operation mode of the dual mode terminals.
Figure 8B:
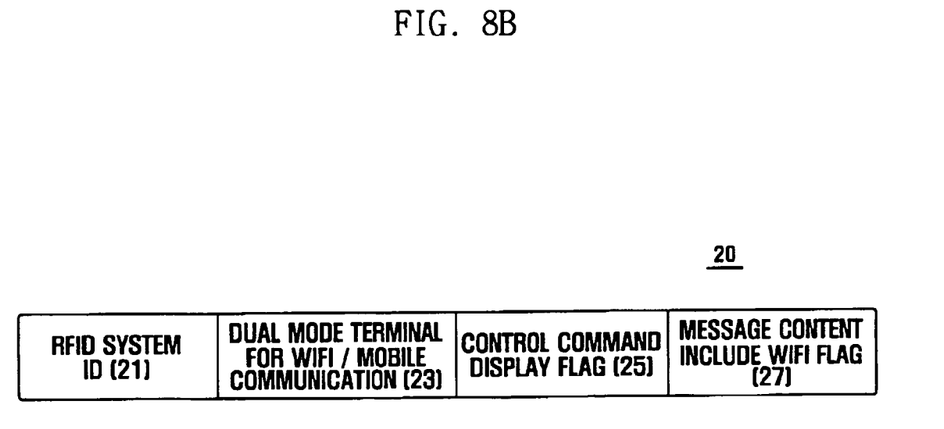

FIGS. 8A and 8B are diagrams illustrating examples of a structure of a message transmitted in the step of changing an operation mode of the dual mode terminals, according to the present invention. FIG. 8A shows a configuration example of RFID tag information transmitted/received between the RFID system and the dual mode terminal. FIG. 8B shows a configuration example of a short message transmitted and received between the RFID system and the dual mode terminal according to the third and fourth embodiments of the present invention.

Referring to FIG. 8A, the RFID tag 10 includes RFID tag information 11 and a WiFi flag 13. The RFID tag information 11 stores RFID information having a predetermined length (for example, 64, 96, or 128 bits) as a basic field defined by the standardization of the RFID tag, and the WiFi flag 13 preferably stores 1 bit data of '0' or '1' for indication of an operation status of a WiFi module in the present invention, because the length of a user's field is not defined in the standardization of the RFID tag.

Referring to FIG. 8B, the short message 20 includes an RFID system ID 21, dual mode terminal information 23, control command display flag 25, and message content 27. Preferably, the RFID system ID 21 stores RFID system identifier as transmitter identifier of the short message 20, the dual mode terminal information 23 stores identifier on the dual mode terminal as receiver identifier of the short message 20, the control command display flag 25 stores information for identifying whether the short message 20 includes a control command, and the message content 27 stores an operation status of a WiFi module (i.e. a WiFi flag).

As described above, the present invention provides an advantage of improving convenience for a dual mode terminal user by automatically changing an operation mode of the dual mode terminal. Additionally, power consumption in the dual mode terminal may be reduced by selectively supplying power to a desired module corresponding to the operation mode of the dual mode terminal. For example, in the case of a WiFi module, the WiFi module is switched on and controlled to operate only in a WiFi service area. Therefore, power consumption of a dual mode terminal including a WiFi service mode may be saved.

Although preferred embodiments of the present invention have been described in detail hereinabove, it should be understood that many variations and/or modifications of the basic inventive concept herein described, which may appear to those skilled in the art, will still fall within the spirit and scope of the preferred embodiments of the present invention as defined in the appended claims.

For example, in the case that a dual mode terminal does not include a reader, a method of controlling a WiFi module in an RFID system by using a short message including a WiFi flag has been described for automatic change of an operation mode of the dual mode terminal. However, the method of controlling the WiFi module is not limited to using a short message. Various messages or channel information (for example, a pilot channel and a paging information transfer message) periodically transmitted to a mobile communication terminal from a base station may also be used.

Additionally, a method of installing an RFID system at an entrance and exit of a WiFi service are a has been described. However, the present invention is not limited to installing the RFID system at the entrance and exit of the WiFi area. For example, the RFID system may be installed at a specific location of the WiFi service area, and may allow a user to pass the specific location for an automatic operation mode change to a WiFi mode.

Additionally, in the case of a dual mode terminal, a method of automatically changing between a WiFi mode and a mobile communication mode has been described. However, the present invention is not limited to the automatic change between the WiFi mode and the mobile communication mode. For example, the present invention may also be applied to a dual mode terminal including another operation mode serviced in a specific area.

Additionally, in the above embodiments, the RFID system includes either an RFID tag unit or an RFID reader and the dual mode terminal includes the other. However the present invention is not limited thereto, and the RFID system or the dual mode terminal may include both an RFID tag unit and RFID reader.

What is claimed is:

1. A method of changing an operation mode of a dual mode terminal having a first communication unit operating in a first service area, comprising the steps of:
   transmitting to a system in the first service area radio frequency identification (RFID) tag information;
   receiving a signal for changing an operation mode of the first communication unit transmitted by the system in the first service area; and
   changing the operation mode of the first communication unit according to the signal for changing an operation mode;
   wherein the RFID tag information comprises information on a power on/off state of the first communication unit and information on a presence of an RFID tag reader for detecting an RFID format signal.

2. The method of claim 1, wherein the changing step comprises:
   powering on the first communication unit, if the signal for changing the operation mode has a value corresponding to entering the first service area; and
   powering off the first communication unit, if the signal for changing the operation mode has a value corresponding to leaving the first service area.

3. The method of claim 2, wherein the first service area is a WiFi service area, and the first communication unit is a WiFi module.

4. The method of claim 1, wherein the RFID tag information further comprises a telephone number of the terminal.

5. The method of claim 1, wherein the receiving step comprises:
   receiving from the system in the first service area the signal for changing the operation mode in an RFID tag format, if the terminal includes the RFID tag reader; and
   receiving from the system in the first service area the signal for changing the operation mode in a short message format, if the terminal does not include the RFID tag reader.

6. A method of changing an operation mode of a dual mode terminal having a first communication unit operating in a first service area, comprising the steps of:
   receiving from the terminal radio frequency identification (RFID) tag information comprising information on a power on/off state of the first communication unit and information on a presence of an RFID tag reader for detecting an RFID format signal; and
   transmitting to the terminal a signal for changing the power on/off state of the first communication unit.

7. The method of claim 6, wherein the RFID tag information further comprises a telephone number of the terminal.

8. The method of claim 6, wherein the first service area is a WiFi service area, and the first communication unit is a WiFi module.

9. The method of claim 6, wherein the transmitting comprises:
   transmitting to the RFID tag reader of the terminal a signal for changing the power on/off state of the first communication unit in an RFID tag format if the terminal includes the RFID tag reader; and transmitting to the terminal a signal for changing the power on/off state of the first communication unit in a short message format if the terminal does not includes the RFID tag reader.

10. A dual mode terminal for changing an operation mode, comprising:
    a first communication unit operating in a first service area;
    a second communication unit operating in at least one of the first service area and a second service area, for receiving a first signal for changing an operation mode of the first communication unit;
    a radio frequency identification (RFID) tag unit for outputting RFID tag information;
    an RFID tag reader for receiving a second signal for changing the operation mode of the first communication unit; and
    a control unit for changing the operation mode of the first communication unit in response to the first signal or the second signal for changing the operation mode;
    wherein the RFID tag information comprises at least one of information on a power on/off state of the first communication unit, a telephone number of the terminal, and information on a presence of the RFID tag reader.

11. The dual mode terminal of claim 10, wherein the RFID tag reader detects the second signal for changing an operation mode in an RFID tag format.

12. The dual mode terminal of claim 10, wherein the second communication unit receives the first signal of changing an operation mode in a short message format.

13. The dual mode terminal of claim 10, wherein the first service area is a WiFi service area, the first communication unit is a WiFi module, and the second communication unit is a mobile communication module.

14. An operation mode changing apparatus for a dual mode terminal corresponding to service areas, comprising:
    a reader for receiving radio frequency identification (RFID) tag information transmitted by the terminal in a first service area;
    an operation mode change signal output unit for outputting a signal for changing an operation mode of a first communication unit of the terminal according to the RFID tag information; and
    an operation mode control unit in the terminal, for controlling the operation mode of the first communication unit of the terminal according to the signal for changing the operation mode,
    wherein the RFID tag information comprises information on a power on/off state of the first communication unit.

15. The operation mode changing apparatus of claim 14, wherein the RFID tag information further comprises a telephone number of the terminal.

16. The operation mode changing apparatus of claim 15, wherein the RFID tag information further comprises information on a presence of an RFID tag reader for detecting an RFID format signal.

17. The operation mode changing apparatus of claim 16, wherein the operation mode change signal output unit outputs the signal for changing the operation mode in an RFID tag format for the RFID tag reader of the terminal, if the RFID tag reader exists in the terminal, and outputs the signal for changing the operation mode in a short message format if the RFID tag reader does not exist in the terminal.

18. The operation mode changing apparatus of claim 16, wherein the operation mode control unit comprises:
    a mobile communication unit for receiving the signal for changing the operation mode; and
    a control unit for changing the operation mode of the first communication unit by switching the power on/off state of the first communication unit according to the signal of changing the operation mode.

19. The operation mode changing apparatus of claim 18, wherein the control unit powers on the first communication unit, if the signal for changing the operation mode has a value corresponding to entering the first service area, and the control unit powers off the first communication unit, if the signal for changing the operation mode has a value corresponding to leaving the first service area.

20. The operation mode changing apparatus of claim 19, wherein the first service area is a WiFi service area, and the first communication unit is a WiFi module.

* * * * *